March 9, 1926.
E. WILLIAMS
TRAFFIC SIGNAL
Filed August 28, 1924 2 Sheets-Sheet 1
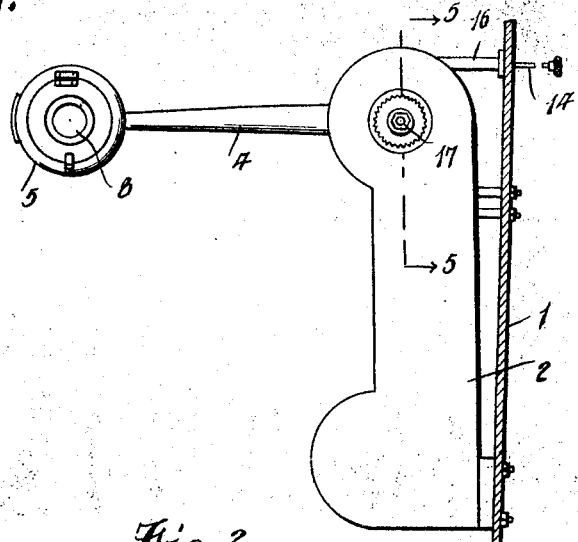
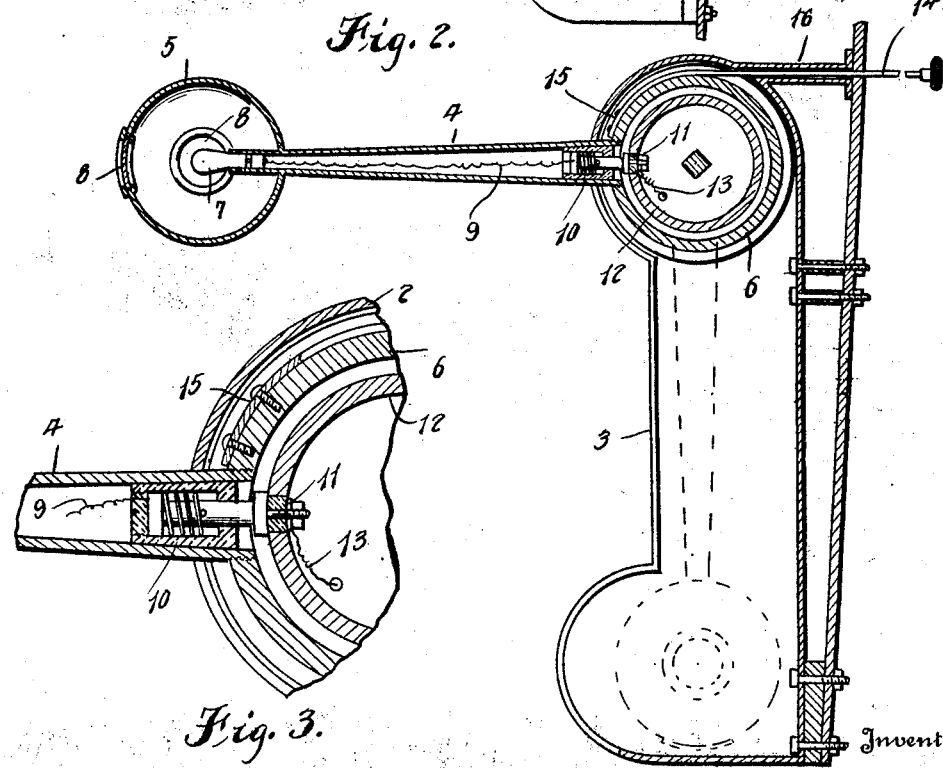
Inventor
E. Williams
By *[signature]*
Attorney March 9, 1926.  
E. WILLIAMS  
TRAFFIC SIGNAL  
Filed August 28, 1924  
1,576,391  
2 Sheets-Sheet 2
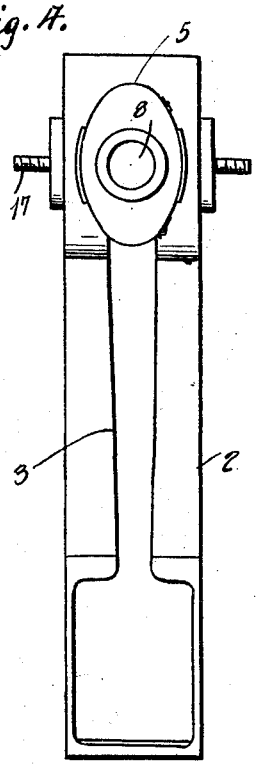
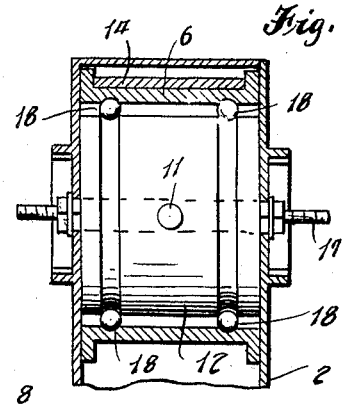
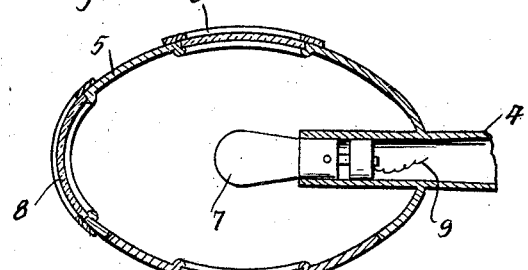
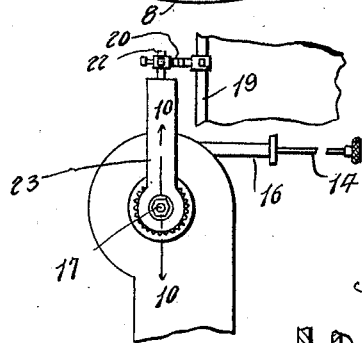
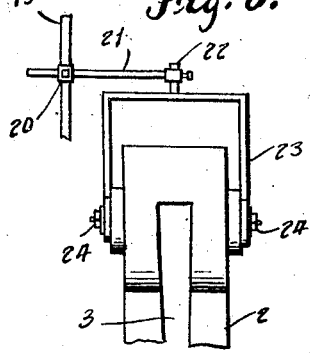
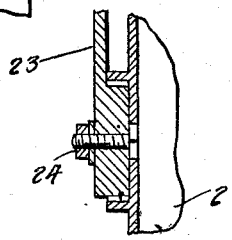
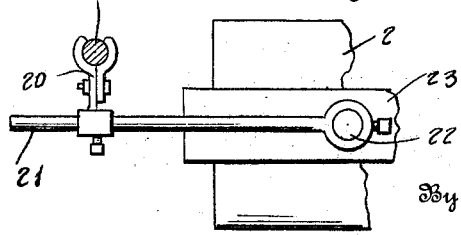
Inventor  
E. Williams.

Patented Mar. 9, 1926.

1,576,391

UNITED STATES PATENT OFFICE.

EDWARD WILLIAMS, OF IOWA PARK, TEXAS.

TRAFFIC SIGNAL.

Application filed August 28, 1924. Serial No. 734,700.

*To all whom it may concern:*

Be it known that I, EDWARD WILLIAMS, a citizen of the United States, residing at Iowa Park, in the county of Wichita and State of Texas, have invented certain new and useful Improvements in Traffic Signals; and I do hereby declare the following to be a full, clear, and exact description of the invention, such as will enable others skilled in the art to which it appertains to make and use the same.

The invention has relation to signaling means for motor vehicles whereby the driver may signal his intention and thereby avoid confusion and a possible casualty, the signaling means including a light to render the same visible after dark, the light being electrical and controllable by means of a switch so that the circuit may be interrupted during the day and closed after dark.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of a vehicle signal embodying the invention and showing the same attached to the body of a vehicle, Figure 2 is an enlarged sectional view, the full lines showing the signal extended, and the dotted lines illustrating the position of the signal when folded, Figure 3 is a fragmentary sectional view showing more clearly the circuit closer for the light circuit, Figure 4 is a front view of the signal, Figure 5 is a detail sectional view on the line 5—5 of Figure 1, Figure 6 is a detail view of the outer end of the signal arm, Figure 7 is a detail view showing an arrangement whereby the signal may be attached to a standard or part of the windshield, Figure 8 is a front view of the part illustrated in Figure 7, Figure 9 is a top plan view of the parts shown in Figures 7 and 8, the upright being in section, and Figure 10 is a detail sectional view on the line 10—10 of Figure 7.

Corresponding and like parts are referred to in the following description and designated in the several views of the drawings by like reference characters.

The numeral 1 denotes the body portion of a motor vehicle to which the signal is adapted to be attached in any preferred way so as to occupy a vertical position, whereby the movable signal member may be extended into horizontal position when displaying a signal and from which position it may drop into a casing 2 which forms a housing therefor. The casing 2 is enlarged at its upper and lower ends and its front is provided with an opening 3 for the passage of the movable signal member which is pivoted at one end to the upper end of the casing. The casing may be attached to any convenient part of the vehicle and may be of any preferred construction best adapted to support and form a housing for the signal member.

The movable or pivoted signal member comprises an arm 4 which is preferably hollow and provided at its outer end with a head 5 and at its inner end with a hub 6. The head 5 may be of any formation and is hollow to receive an electric bulb 7. Openings are formed in the front and rear side of the head 5 and in the outer extreme portion, and these openings receive lenses 8 or translucent plates which may be red or of other preferred color to display any hue of light. A lead wire 9 passes through the arm 4 and connects the bulb receiving socket with a plug 10 at the inner end of the arm, said plug being adapted to register with a plug 11 attached to the circular bearing 12 upon which the hub portion 6 of the pivoted signal member is mounted, a wire 13 from a suitable source of supply of electricity is connected with the plug 11 and when the arm 4 is extended into horizontal position the light circuit is closed and the signal illuminated after dark, provided the main switch has been closed. When the signal arm 4 is lowered into folded position as indicated by the dotted lines in Figure 2 the light circuit is broken, thereby preventing waste of current but when the signal arm is extended into operative position as indicated by the full lines in Figures 2 and 3 the light circuit is closed by the registering of the plugs or contacts 10 and 11.

An operating member 14 is provided for operating the signal and extends within convenient reach of the driver and this operating member preferably consists of a flexible strap which is attached at one end to the hub 6 as indicated at 15 and which passes through an opening in the upper enlarged portion of the casing 2 and through a guide 16 and which is provided at its end with a button to be conveniently gripped when pulling upon the member 14 to extend the signal into operative or horizontal position. When the operating member 14 is released, the signal member drops into inoperative or folded position as indicated by the dotted lines in Figure 2 and becomes housed within the casing 2. The signal member may be pivoted to the casing in any preferred way and as shown a rod 17 is provided and to reduce the friction to the smallest amount ball bearings 18 are interposed between the circular bearing 12 and the hub 6 as indicated most clearly in Figure 5.

When the signal is designed to be attached to an upright or frame 19 of the windshield, a clamp 20 is attached to the part 19 and engages a rod 21 which is clamped to an extension 22 of a yoke 23 which has its side members pivoted to the casing 2 as indicated at 24.

What is claimed is:—

A signal of the class described comprising a housing, a signal arm pivoted to the housing normally disposed within the housing, said housing having a bearing, said signal arm having a ring surrounding said bearing, said bearing having grooves, bearing balls in said grooves engaging the inner surface of the bearing ring, said bearing ring having outwardly extending marginal flanges, an operating strap fastened to the ring and disposed intermediate said flanges, and a guide member extending from the housing being tubular to guide the operating element and being adapted for engagement against a support.

In testimony whereof I affix my signature.

EDWARD WILLIAMS.